United States Patent [19]

Ohishi

[11] Patent Number: 4,839,785
[45] Date of Patent: Jun. 13, 1989

[54] HEADLIGHT MOUNTING DEVICE
[75] Inventor: Kazutami Ohishi, Shizuoka, Japan
[73] Assignee: Koito Seisakusho Co. Ltd., Tokyo, Japan
[21] Appl. No.: 217,783
[22] Filed: Jul. 12, 1988
[30] Foreign Application Priority Data Jul. 13, 1987 [JP] Japan .................................. 62-174336

[51] Int. Cl.4 ............................................ F21V 19/02
[52] U.S. Cl. ..................................... 362/418; 362/61; 362/419; 362/427; 362/430
[58] Field of Search ...................... 362/61, 80, 66, 418, 362/419, 420, 421, 422, 427, 428, 285, 287, 289, 430, 425; 248/486, 183

[56] References Cited

U.S. PATENT DOCUMENTS

| | | | |
|---|---|---|---|
| 3,385,546 | 5/1968 | Scowen | 362/418 |
| 4,188,655 | 2/1980 | Tallon et al. | 362/419 |
| 4,491,901 | 1/1985 | Sigety, Jr. | 362/418 |
| 4,674,013 | 6/1987 | Manzoni | 362/428 |
| 4,709,306 | 11/1987 | Harris et al. | 362/419 |
| 4,757,428 | 7/1988 | Ryder et al. | 362/420 |
| 4,761,717 | 8/1988 | McMahon et al. | 362/80 |

Primary Examiner—Ira S. Lazarus
Assistant Examiner—D. M. Cox
Attorney, Agent, or Firm—Sughrue, Mion, Zinn, Macpeak & Seas

[57] ABSTRACT

A headlight mounting device for mounting a headlight of a body of a vehicle such as an automobile and includes between the vehicle body and the headlight a stationary pivot means and two movable pivot means with each pivot means pivotally supports the headlight with respect to the vehicle body, and one of the movable pivot means being movable in the vertical directions and the other movable pivot means being movable in the horizontal directions. The stationary pivot means and the two movable pivot means are arranged generally in a common plane.

7 Claims, 5 Drawing Sheets

HEADLIGHT MOUNTING DEVICE

FIELD OF THE INVENTION

The present invention relates to a headlight mounting device for mounting a headlight on a vehicle such as an automobile and the like and particularly to a device for mounting the headlight tiltably both in the vertical and the transverse directions.

DESCRIPTION OF THE PRIOR ART

There are various headlight mounting devices having one stationary pivot means and two movable pivot means for enabling the adjustment of the direction of the light beam of the headlight in desired directions.

FIG. 5 shows the location of these pivot means in a typical prior art headlight mounting device, wherein A shows the location of the stationary pivot means and B and C show respectively the location of movable pivot means. The movable pivot means are adapted to generally move in the front and rear directions or the directions vertical to the paper of the drawing. Each pivot means supports pivotally the headlight a relative to the body of the vehicle. Thus, when the pivot means B is moved in the front or rear direction, the headlight a rotates around a line b connecting the pivot means A and C, and when the pivot means C is moved in the front or rear direction the headlight a rotates around a line c which connects the pivot means A and B. Therefore, the direction of the headlight a can easily be adjusted by moving the pivot means B and C suitably.

However, when the pivot means B or C is moved the tilting movement of the headlight a is not a simple rotation in the vertical or transverse direction and, it is required in adjusting the headlight in the vertical or transverse direction to move both of the pivot means B and C. In detail, when the movable pivot means B is moved to adjust the headlight in the vertical direction and, thereafter, the movable pivot means C is moved for adjusting in the transverse direction, the headlight a moves both in the transverse and vertical directions, thus, it is required to adjust the movable pivot means B again. Such adjustment is troublesome and time consuming.

FIG. 6 shows another prior art headlight mounting device wherein a fixed pivot means A' and movable pivot means B' and C' are disposed such that a line b' connecting the pivot means A' and C' extends horizontally and a line c' connecting the pivot means A' and B' extends vertically as viewed in the front view of FIG. 6. Since lines b' and c' extend horizontally and vertically, respectively, the adjustment of the pivot means B' or C' moves the headlight a' only in the vertical or transverse direction, whereby the adjustment operation can be simplified.

However, in the prior art headlight mounting device of FIG. 6, the location of the pivot means is considerably restricted and a relatively large space is required to receive the pivot means, thereby increasing the size of the headlight device.

SUMMARY OF THE INVENTION

An object of the present invention is to overcome the shortcomings in the prior art devices and, according to the invention, there is provided a headlight mounting device for mounting a headlight and comprising a fixed pivot means and two movably pivot means, with one of the movable pivot means being movable in the vertical direction and the other movable pivot means being movable in the horizontal direction, and these three pivot means being arranged generally in a common plane.

According to the invention, the pivot means are required to be arranged in a common plane, thus, it is possible to substantially reduce the spacial limitation in the arrangement of the mechanisms for moving the movable pivot means and, since the vertical or horizontal adjusting movement of the headlight is effected by either one of the movable pivot means the adjustment of the direction of the headlight is very easy.

BRIEF DESCRIPTION OF THE DRAWINGS

Further objects and advantages of the invention will become apparent from the following detailed description in conjunction with accompanying drawings, in which.

DETAILED DESCRIPTION OF PREFERRED EMBODIMENTS

Figure 1:
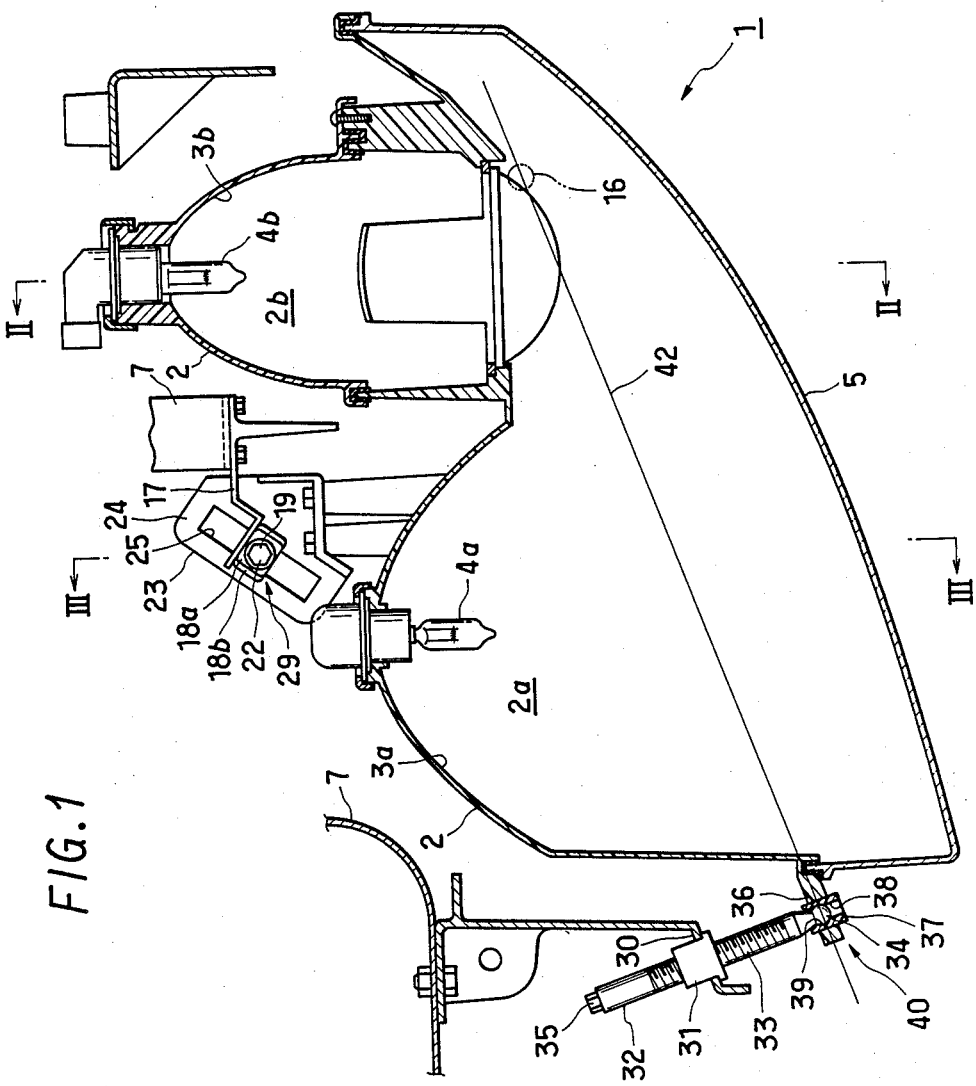
FIG. 1 is a horizontal sectional view of a headlight device according to one embodiment of the invention.

FIG. 1–FIG. 4 show a headlight device 1 according to one embodiment of the present invention, which comprises a lamp body 2 defining two juxtaposed lamp house portions 2a and 2b. Reflective surfaces 3a and 3b are formed respectively on the inner surfaces of the lamp house portions 2a and 2b. Electric bulbs 4a and 4b are supported respectively in the lamp house portions 2a and 2b. A lens 5 covers the front surface of the lamp body 2.

A housing 6 is secured to a vehicle body member 7, and has a frame like configuration with the front and rear ends being open. The major portion of the lamp body 2 is received in the housing 6.

Figure 2:
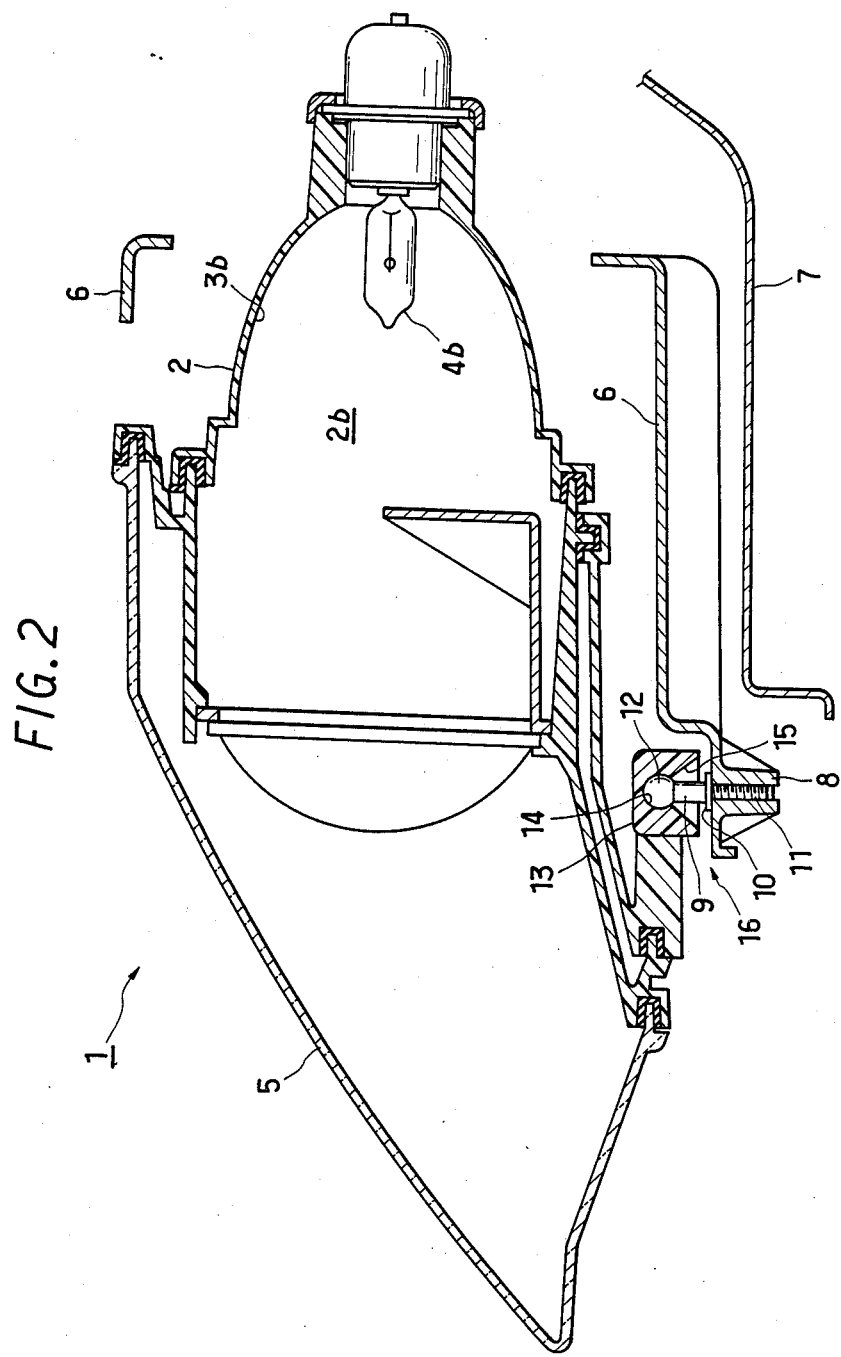
FIG. 2 is a section view taken along line II—II in FIG. 1.

A mounting boss 8 (FIGS. 2 and 4) is provided on the housing 6 at the location adjacent to the front end and to the right end, and projects in the downward direction. A pivot shaft 9 extends upward from the boss 8. As shown in FIG. 2, the pivot shaft 9 has a flange 10 on the intermediate portion, a screw thread portion 11 on the lower portion, and a ball shaped portion 12 on the upper portion. The screw thread portion 11 engages screw-threadingly with the mounting boss 8 with the flange 10 engaging tightly with the housing 6 such that the pivot shaft 9 is secured to the housing 6.

A receptacle member 13 is secured on the right bottom surface of the lamp body 2, and has in the lower surface a spherical recess 14 for engaging with the ball shaped portion 12 of the pivot shaft 9. The spherical recess 14 is connected to a downward diverging recess portion 15 as shown in FIG. 2. Thus, the ball shaped portion 12 of the pivot shaft 9 and the spherical recess 14 of the receptacle member 13 constitute the stationary pivot means 16.

Figure 3:
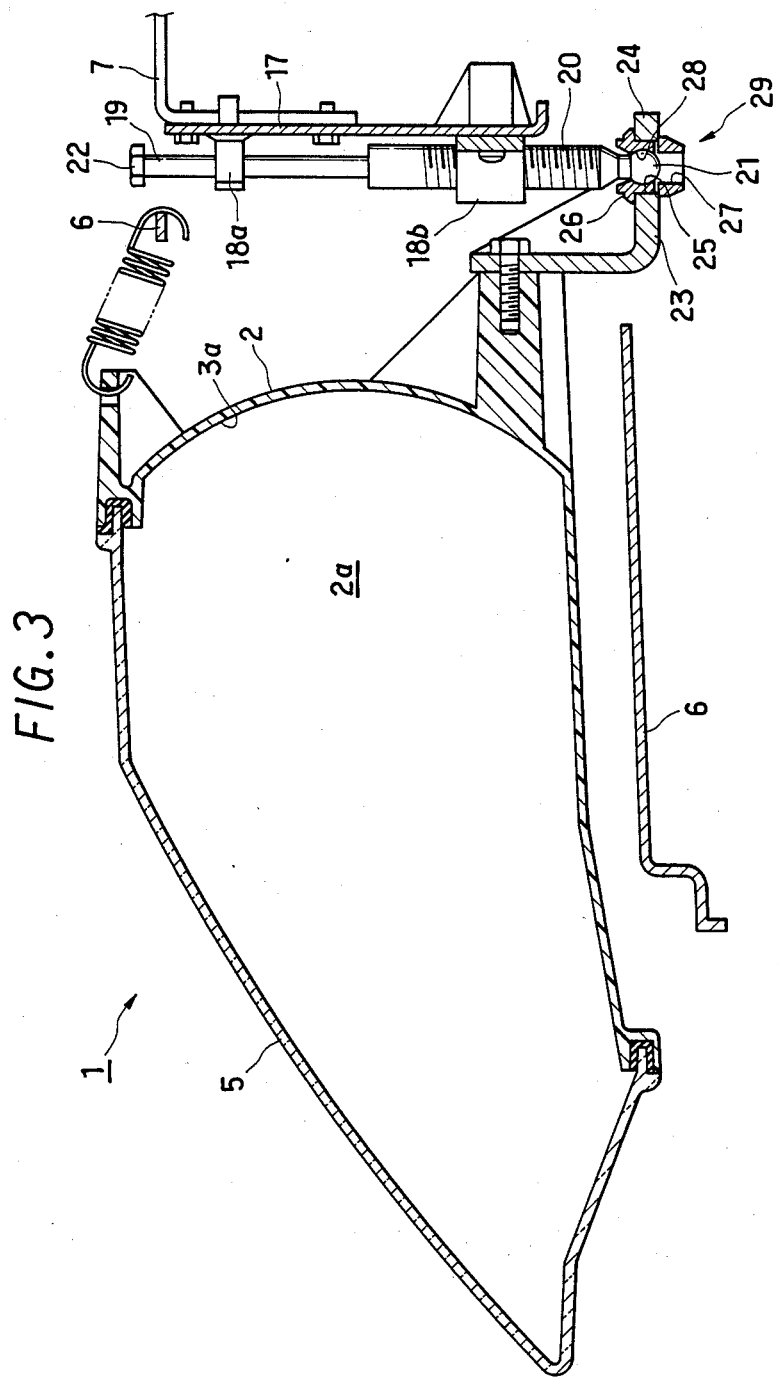
FIG. 3 is a section view taken along line III—III in FIG. 1.

As shown in FIG. 3, a bracket 17 is secured to the body member 7 and has two vertically spaced support members 18a and 18b projecting toward the lamp body 2. The support members 18a and 18b support an adjusting shaft 19 vertically movably. The support shaft 19 integrally comprises a screw-thread portion 20 on the lower half portion, a ball shaped member 21 on the lower end and a head portion 22 on the upper end. The support shaft 19 is supported vertically by the support members 18a and 18b with the upper half portion of the shaft 19 being slidably and rotatably on the support member 18a and the screw-thread portion 21 of the shaft 19 engaging screwthreadingly with the support member 18b.

A connecting plate or bracket 23 is secured the right rear portion of the lower part of the left side lamp house portion 2a of the lamp body 2, and has a generally horizontal portion 24 having an inclined slide groove 25 which extends between the left front and the right rear directions as shown in FIG. 1. The groove 25 extends along a circular arc with the center of which aligning the stationary pivot means 16. A receptacle member 26 is slidably supported along the slide groove 25 and has a vertically extending bore 27 therethrough. A spherical recess 28 is formed on the intermediate portion of the bore 27 as shown in FIG. 3. The ball shaped member 21 formed on the lower end of the adjusting shaft 19 is pivotally fitted in the spherical recess 28 to constitute a vertically movable pivot means 29.

When the adjusting shaft 19 is rotated relative to the support member 18b in the direction threading out of the support member 18b the adjusting shaft 19 moves upward, and when the adjusting shaft 19 is rotated relative to the support member 18b in the direction threading into the support member 18b the adjusting shaft 19 moves downward. Such vertical movement of the adjusting shaft 19 causes the vertical movement of the receptacle member 26, whereby the right rear portion of the left side lamp house portion 2a of the lamp body 2 moves vertically.

Figure 4:
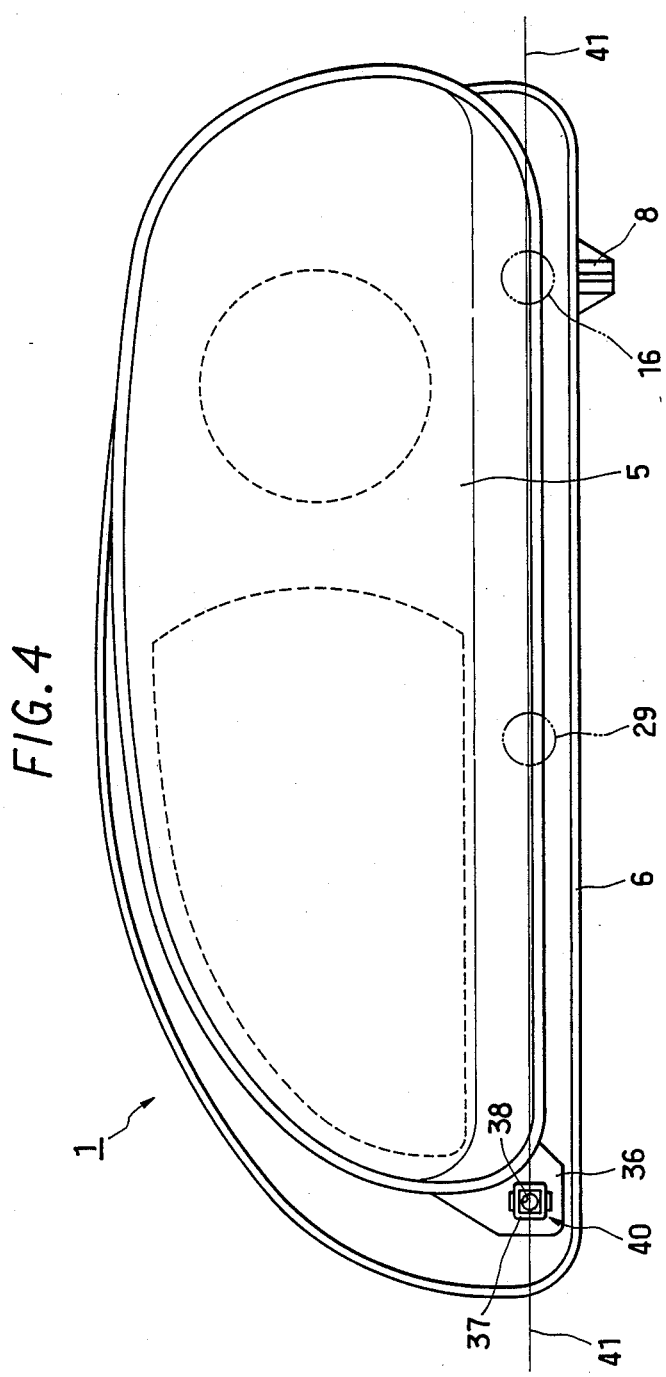
FIG. 4 is a front view of the headlight device of FIG. 1.
Figure 5:
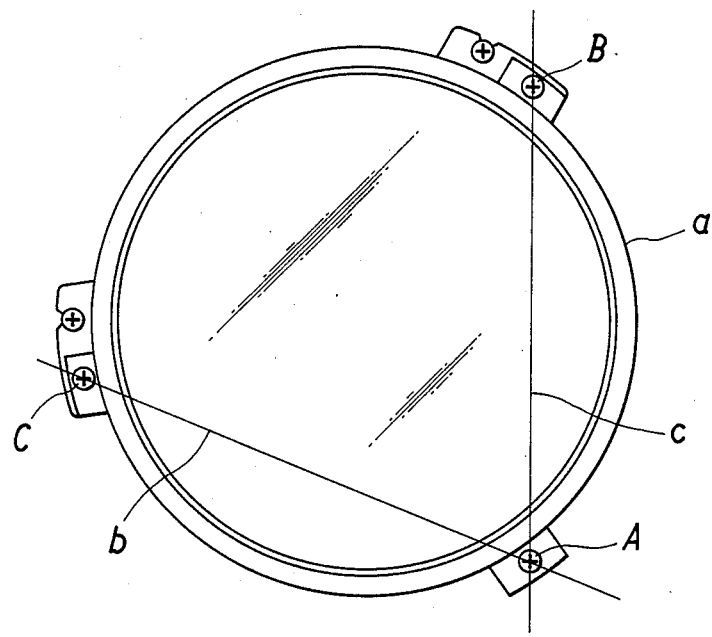
FIG. 5 is a front view of a headlight device according to a prior art headlight device.
Figure 6:
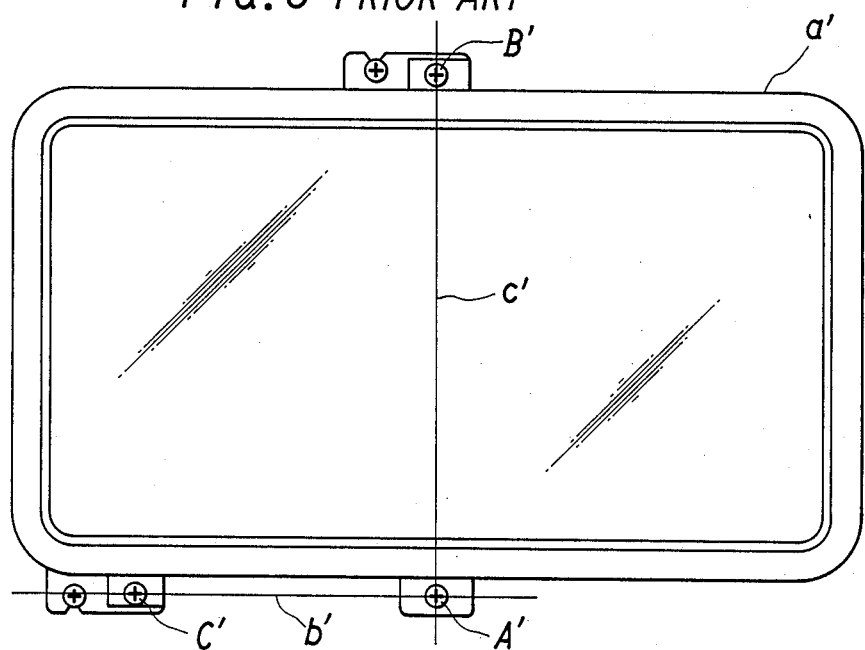
FIG. 6 is a front view of another prior art headlight device.

As shown in FIGS. 1 and 4, a bracket 30 is secured to the vehicle body member 7, and a supporting member 31 is secured to the tip end of the bracket 30. An adjusting shaft 32 having a screw-thread portion 33 is screwthreadingly supported on the supporting member 31. The shaft 32 further has integrally a ball shaped portion 34 on the front end and a head portion 35 on the rear end.

A bracket 36 is formed on the lamp body 2 to project from the lower end portion of the left side surface of the lamp body 2 and adjacent to the front end thereof toward the left downward direction. A receptacle member 37 is supported on the bracket 36. A through bore 38 is formed in the receptacle member 37, and a spherical recess 39 is formed in the intermediate portion of the bore 38 for engaging pivotally with the ball shaped member 34 of the adjusting shaft 32. The ball member 34 and the recess 39 constitute a horizontally movable pivot means 40.

When the adjusting shaft 32 is rotated relative to the support member 31 in the direction threading out of the support member 31 the adjusting shaft 19 moves rearward, whereby the left side portion of the headlight 1 moves rearward. And when the adjusting shaft 32 is rotated in the direction threading into the support member 31 relative to the support member 31 the adjusting shaft 19 moves forward, whereby the left side portion of the headlight 1 moves rearward.

The stationary pivot means 16, the vertically movable pivot means 29 and the horizontally movable pivot means 40 are arranged on a common horizontal plane 41 according to the invention.

Incidentally, it will be noted that the vertically movable pivot means 29 moves by some amount during the adjusting operation so that the pivot means 16, 29 and 40 are not necessarily disposed in a geometrical common horizontal plane, and are required to be disposed in a substantial common horizontal plane 41.

The adjusting operation of the headlight mounting device will now be explained.

In adjusting the light beam of the headlight 1 in the vertical direction, the adjusting shaft 19 is rotated in a desired direction. The vertically movable pivot means 29 moves upward or downward in response to the direction of the rotation of the adjusting shaft 19. The headlight 1 rotates around a rotational axis 42 connecting the stationary pivot means 16 with the horizontally movable pivot means 40, and the direction of the light beam of the headlight 1 is adjusted in the upward or downward direction.

Since the horizontally movable pivot means 40 and the stationary pivot means 16 are located on the common horizontal plane 41, the rotational axis 42 extends horizontally so that the rotational movement of the headlight 1 does not substantially include any horizontal components, and the headlight 1 is adjusted only in the vertical directions.

In adjusting the light beam of the headlight 1 in the horizontal directions, another adjusting shaft 32 is rotated in a desired direction. The horizontally movable pivot means 40 moves forward or rearward in response to the direction of the rotation of the adjusting shaft 32. The headlight 1 rotates around the stationary pivot means 16, and the receptacle 26 of the vertically movable pivot means 29 moves slidingly along the slide groove 25 which is formed in the horizontal portion 24 of the bracket 23, thus, the direction of the light beam of the headlight 1 is adjusted only in the horizontal directions.

The stationary pivot means 16, the horizontally movable pivot means 40 and the vertically movable pivot means 29 are located on the common horizontal plane 41, so that any vertical components do not substantially included in the rotational movement of the headlight 1, and the adjustment of the headlight 1 is effected in the horizontal directions.

It will be noted that the three pivot means are required to be arranged on a substantially common horizontal plane, thus, the vertically movable pivot means 29 in the embodiment is disposed between two lamp house portions 2a and 2b, which space has constituted a dead space in prior art headlights. Therefore, according to the invention, the restriction in arranging the pivot means can substantially be reduced, and the space for mounting the headlight unit can effectively be reduced since the mechanisms for moving the movable pivot means can be disposed in any desired space.

As described heretofore, the headlight mounting device according to the invention comprises a stationary pivot means and two movable pivot means, with one of the movable pivot meanss being movable in the vertical directions and the other movable pivot means being movable in the horizontal directions, and these three pivot means being generally arranged in a common plane, preferably, a horizontal or vertical plane, thus, it is easy to find the space for arranging the pivot means, which substantially reduce the restriction relative to the arrangement of the pivot means and, further, the adjusting operation is very easy since it is possible to arrange such that the displacement of either one of the movable pivot means moves the headlight in either of the horizontal and vertical directions.

Further, there is a large amount of freedom in determining the arrangement of the pivot means and of the mechanisms for moving the movable pivot means, thus, the overall size of the headlight device including the headlight mounting device can be reduced.

Although the description has been made with respect to a preferred embodiment, numerous modifications and alternate embodiments can easily be made to those skilled in the art, and it is intended that the invention be limited only in the terms of the appended claims.

What is claimed is:

1. A headlight mounting device for mounting a headlight on a body of a vehicle and including between the headlight and the body of the vehicle a stationary pivot means and two movable pivot means with each of the pivot means supporting pivotally the headlight at the location spaced apart from each other, and one of said movable pivot means being movable in the vertical direction and the other movable pivot means being movable in the horizontal direction, characterized in that these three pivot means are arranged generally in a common plane.

2. A headlight mounting device as set forth in claim 1 wherein, said common plane is a generally horizontal plane.

3. A headlight mounting device as set forth in claim 2 wherein, one of the movable pivot means is movable in the horizontal directions, and the other of the movable pivot means is movable in the vertical directions.

4. A headlight mounting device as set forth in claim 3 wherein, the vertically movable pivot means is slidable in the common horizontal plane along an arcuate path with the center of the curvature of the arcuate path aligning generally with the stationary pivot means.

5. A headlight mounting device as set forth in claim 1 wherein, said common plane is a generally vertical plane.

6. A headlight mounting device as set forth in claim 5 wherein, one of the movable pivot means is movable in the horizontal directions, and the other of the movable pivot means is movable in the vertical directions.

7. A headlight mounting device as set forth in claim 6 wherein, the horizontally movable pivot means is slidable in the common vertical plane along an arcuate path with the center of the curvature of the arcuate path aligning generally with the stationary pivot means.

* * * * *